United States Patent
Delaney et al.

(10) Patent No.: US 11,061,975 B2
(45) Date of Patent: Jul. 13, 2021

(54) COGNITIVE CONTENT SUGGESTIVE SHARING AND DISPLAY DECAY

(71) Applicant: International Business Machines Corporation, Armonk, NY (US)

(72) Inventors: Mark P. Delaney, Raleigh, NC (US); Robert H. Grant, Austin, TX (US); Trudy L. Hewitt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 15/793,193

(22) Filed: Oct. 25, 2017

(65) Prior Publication Data
US 2019/0121911 A1 Apr. 25, 2019

(51) Int. Cl.
*G06F 16/9535* (2019.01)
*G06Q 50/00* (2012.01)
(Continued)

(52) U.S. Cl.
CPC .......... *G06F 16/9535* (2019.01); *G06F 40/10* (2020.01); *G06F 40/263* (2020.01);
(Continued)

(58) Field of Classification Search
CPC .... G06F 16/9535; G06F 17/21; G06F 17/275; G06F 17/2785; G06K 9/00221;
(Continued)

(56) References Cited

U.S. PATENT DOCUMENTS 8,666,993 B2  3/2014  Chunilal
8,909,583 B2  12/2014  Wilson et al.
(Continued)

FOREIGN PATENT DOCUMENTS

WO  2013078032 A1  5/2013

OTHER PUBLICATIONS

Unknown, "Trust profiles for exposure of social media content", IPCOM000247406D, Sep. 2, 2016, 5 pgs.
(Continued)

*Primary Examiner* — Taelor Kim
(74) *Attorney, Agent, or Firm* — Michael P. O'Keefe; Hunter E. Webb; Keohane & D'Alessandro, PLLC

(57) ABSTRACT

Disclosed embodiments provide techniques for automatically suggesting members of a social media system as recipients for sharing an item of social media content. Computerized analysis of the social media content includes image analysis, audio analysis, and language analysis for classifying the content. Profiles of participants within a social media system are examined to determine candidates for sharing. A subset of participants having profiles with metadata deemed relevant to the analyzed social media content is obtained. For each participant in the subset, an interaction score is computed, indicative of the amount of interaction between the participant and the sender of the content has occurred previously. The subset is ranked based on the interaction score. Participants having an interaction score above a predetermined threshold are deemed to be candidates for sharing the item of social media content, and are presented to a user on an electronic display.

20 Claims, 9 Drawing Sheets

(51) Int. Cl.
*H04L 29/08* (2006.01)
*G06K 9/00* (2006.01)
*G06F 40/10* (2020.01)
*G06F 40/30* (2020.01)
*G06F 40/263* (2020.01)

(52) U.S. Cl.
CPC ......... *G06F 40/30* (2020.01); *G06K 9/00221* (2013.01); *G06K 9/00671* (2013.01); *G06Q 50/01* (2013.01); *H04L 67/02* (2013.01); *H04L 67/36* (2013.01); *H04L 29/08936* (2013.01); *H04L 67/306* (2013.01)

(58) Field of Classification Search
CPC ... G06Q 50/01; H04L 29/08936; H04L 67/02; H04L 67/306; H04L 67/36
See application file for complete search history.

(56) References Cited

U.S. PATENT DOCUMENTS

| | | | |
|---|---|---|---|
| 9,060,029 B2 | 6/2015 | Amsterdamski | |
| 9,264,463 B2* | 2/2016 | Rubinstein | H04L 65/403 |
| 2010/0228617 A1* | 9/2010 | Ransom | G06Q 30/02 |
| | | | 705/14.25 |
| 2012/0173373 A1* | 7/2012 | Soroca | G06Q 30/0241 |
| | | | 705/26.3 |
| 2012/0259919 A1* | 10/2012 | Yan | G06Q 30/02 |
| | | | 709/204 |
| 2012/0317198 A1* | 12/2012 | Patton | G06Q 10/10 |
| | | | 709/204 |
| 2013/0311555 A1* | 11/2013 | Laoutaris | H04L 12/6418 |
| | | | 709/204 |
| 2014/0282096 A1* | 9/2014 | Rubinstein | H04L 65/403 |
| | | | 715/753 |
| 2014/0289261 A1* | 9/2014 | Shivakumar | G06Q 10/101 |
| | | | 707/748 |
| 2015/0304437 A1* | 10/2015 | Vaccari | G06F 16/9537 |
| | | | 709/204 |
| 2015/0356442 A1 | 12/2015 | Chawla et al. | |
| 2016/0035046 A1* | 2/2016 | Gupta | G06Q 50/01 |
| | | | 705/7.29 |
| 2016/0149956 A1* | 5/2016 | Birnbaum | H04L 63/101 |
| | | | 726/1 |
| 2017/0054821 A2 | 2/2017 | Rathod | |
| 2017/0323340 A1* | 11/2017 | Jeon | H04L 67/20 |
| 2017/0344610 A1* | 11/2017 | Evnine | G06F 16/9535 |
| 2017/0374072 A1* | 12/2017 | Steinberg | H04L 63/10 |

OTHER PUBLICATIONS

Unknown, "System & Method to Minimize Redundant Posts and Maximize Social Network Interaction", IPCOM000239577D, Nov. 17, 2014, 3 pgs.
Goldman, David, "New Gmail feature scans your emails and suggests replies", CNN tech, Nov. 9, 2015, 7 pgs.
Unknown, "Audience Optimization", Facebook Media, 2015, 7pgs.
Unknown, "How to target Facebook Ads: Refine your advertising to reach the people who matter most to your business", Jul. 2017, 7 pgs.
Wu et al., "Temporal Social Tagging Based Collaborative Filtering Recommender for Digital Library", ICADL 2012, LNCS 7634, pp. 199-208, 2012.
Unknown, "System and Method to automatically identify appropriate social network recipients for post based on content and prior user behavior", IPCOM000229415D, Jul. 28, 2013, 3 pgs.

* cited by examiner

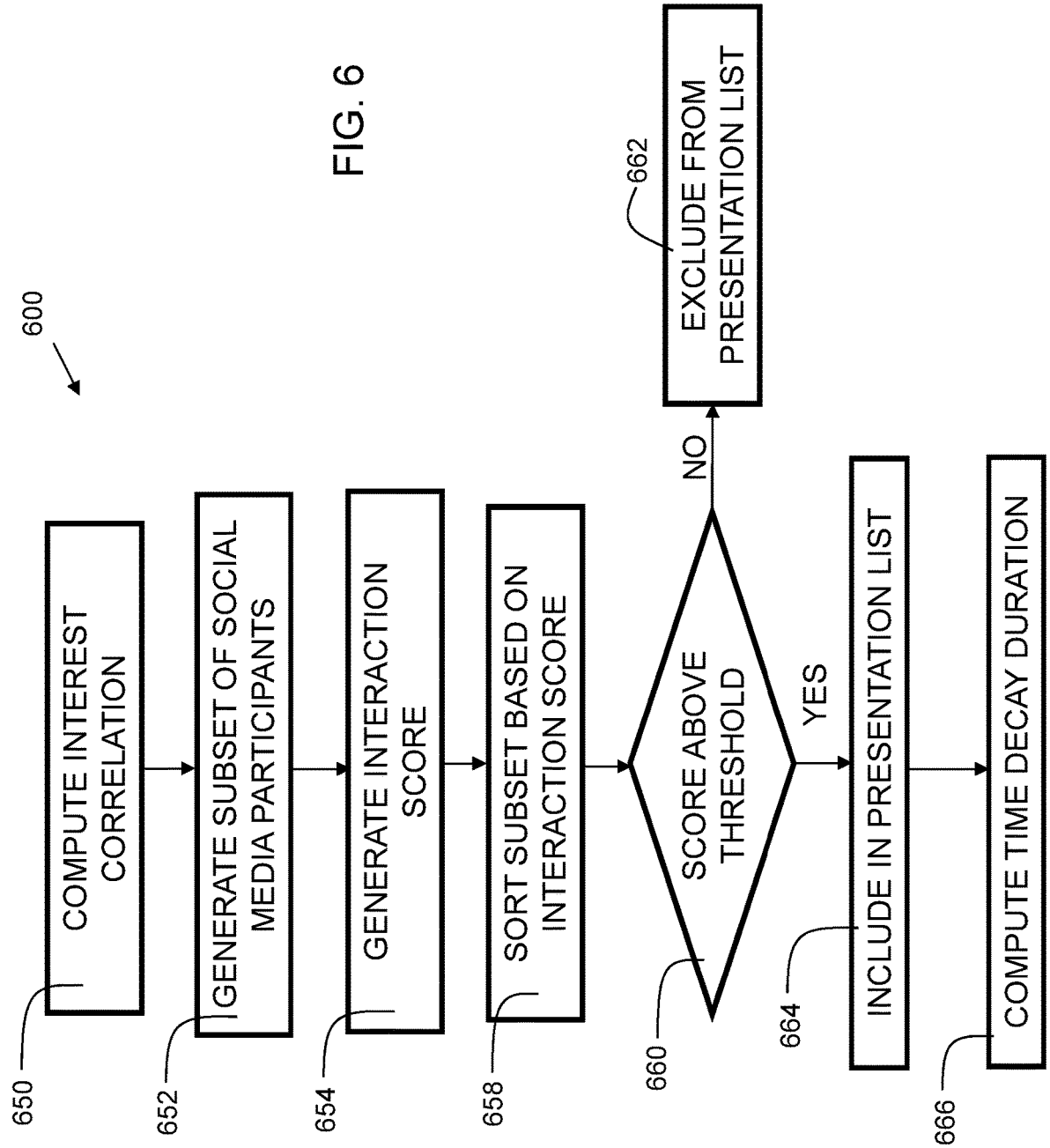

COGNITIVE CONTENT SUGGESTIVE SHARING AND DISPLAY DECAY

FIELD OF THE INVENTION

Embodiments of the invention relate to social media content sharing, and more particularly to cognitive content suggestive sharing and display decay.

BACKGROUND

Social media websites can have millions (or even more) users. On these sites, a user usually registers for an account and enters some information about him/herself. The person can connect his/her account with the accounts of others in order to share information with them. A profile page is often used to represent an individual. It typically includes information about the user, such as a profile photo, bio, website, feed of recent posts, recommendations, recent activity and more. A person's account, or page, could have thousands or more accounts connected to it (i.e., friends). Connections and associations, sometimes referred to as friends, followers, groups, may interact with the user. Individuals use their accounts to connect with other users. They can also use them to subscribe to certain forms of information. Social media is used by friends and families to share content and stay informed about events in local, regional, and world venues. With so many users, and so much information distributed on these sites, it can be difficult to get information to the particular people who would be interested in a particular topic.

SUMMARY

In one aspect, there is provided a computer-implemented method for providing a set of social media participants as potential recipients of an item of shared content, comprising: computing an interest correlation for each social media participant to the item of shared content; generating a subset of social media participants wherein each social media participant in the subset of social media participants has an interest correlation above a predetermined threshold; generating an interaction score for each social media participant in the subset; ranking the subset of social media participants by interaction score; and presenting one or more social media participants of the subset on an electronic display as potential recipients for the item of shared content.

In another aspect, there is provided an electronic communication device comprising: a processor; a memory coupled to the processor, the memory containing instructions, that when executed by the processor, perform the steps of: computing an interest correlation for each social media participant to the item of shared content; generating a subset of social media participants wherein each social media participant in the subset of social media participants has an interest correlation above a predetermined threshold; generating an interaction score for each social media participant in the subset; ranking the subset of social media participants by interaction score; and presenting one or more social media participants of the subset on an electronic display as potential recipients for the item of shared content.

In another aspect, there is provided a computer program product for providing a set of social media participants as potential recipients of an item of shared content, for an electronic computing device comprising a computer readable storage medium having program instructions embodied therewith, the program instructions executable by a processor to cause the electronic computing device to: compute an interest correlation for each social media participant to the item of shared content; generate a subset of social media participants wherein each social media participant in the subset of social media participants has an interest correlation above a predetermined threshold; generate an interaction score for each social media participant in the subset; rank the subset of social media participants by interaction score; and present one or more social media participants of the subset on an electronic display as potential recipients for the item of shared content.

BRIEF DESCRIPTION OF THE DRAWINGS

Features of the disclosed embodiments will be more readily understood from the following detailed description of the various aspects of the invention taken in conjunction with the accompanying drawings.

FIG. 6 is a flowchart indicating process steps for embodiments of the present invention.

Figure 1:
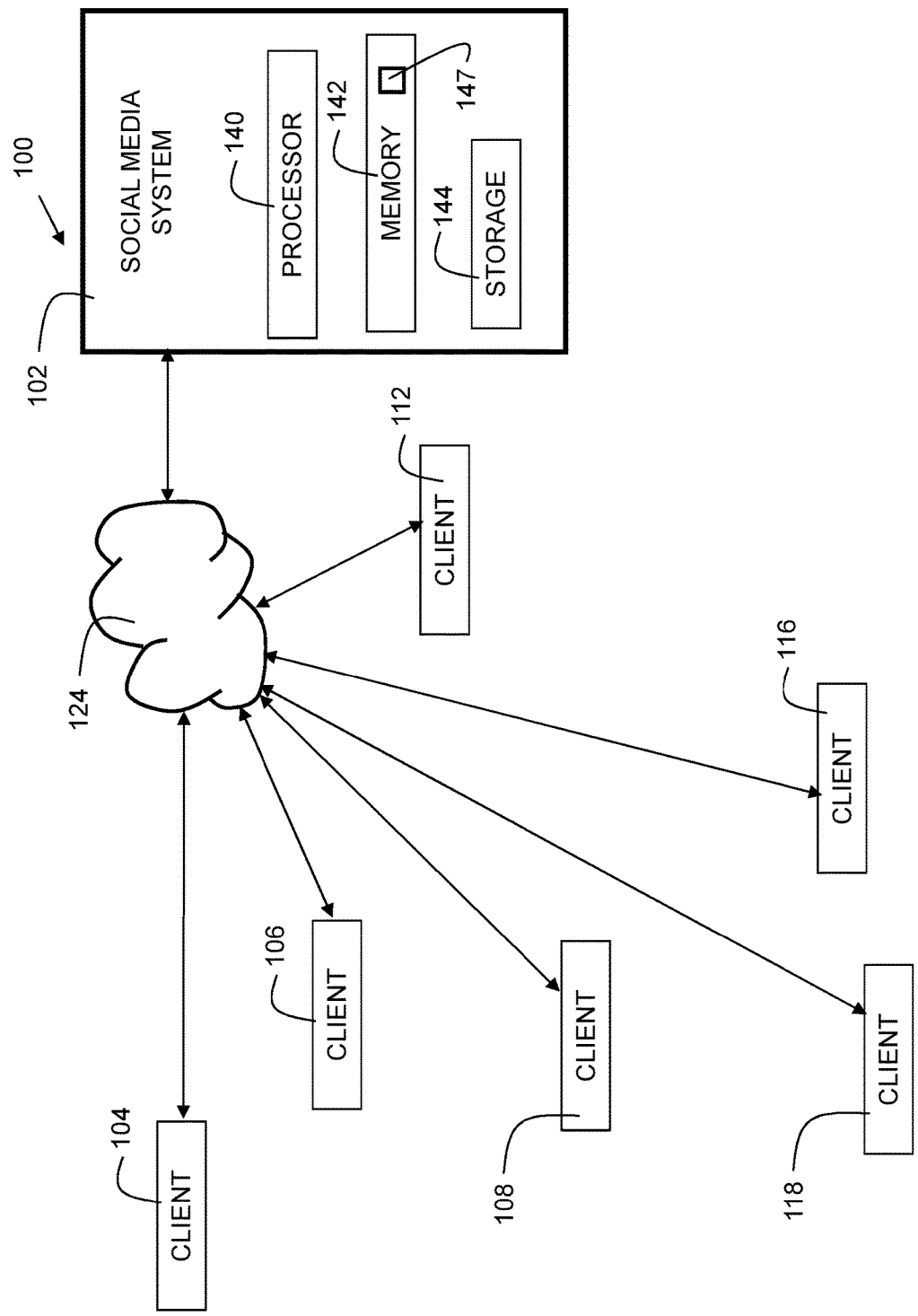
FIG. 1 is a system diagram illustrating embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Disclosed embodiments provide techniques for automatically suggesting members of a social media system as recipients for sharing an item of social media content. Computerized analysis of the social media content includes image analysis, audio analysis, and language analysis for classifying the content. Profiles of participants within a social media system are examined to determine candidates for sharing. A subset of participants having profiles with metadata relevant to the analyzed social media content is obtained. For each participant in the subset, an interaction score is computed. The subset is ranked based on the interaction score. Participants having an interaction score above a predetermined threshold are deemed to be candidates for sharing the item of social media content, and are presented to a user on an electronic display. This enables convenient selection of social media content for sharing. Furthermore, it can facilitate additional sharing by alerting or reminding users of contacts, friends, and others who may be interested in what they are about to post. This may include sending the content to contacts they had forgotten about, or to contacts or participants that they had not previously realized may be interested in a given piece of content. In this way, the social media experience can be enhanced.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, and/or elements.

FIG. 1 is a diagram 100 of an environment for embodiments of the present invention. Social media system 102 comprises processor 140, memory 142, and storage 144. Instructions 147 for executing embodiments of the present invention are shown stored in memory 142. Social media system 102 is in communication with network 124. In embodiments, network may be the Internet, a wide area network (WAN), a local area network (LAN), a cloud network, or any other suitable network. Client devices 104, 106, 108, 112, 116, and 118 are also in communication with network 124. Client devices can be smartphones, tablet computers, laptop computers, desktop computers, a combination thereof, or other suitable devices.

Figure 2:
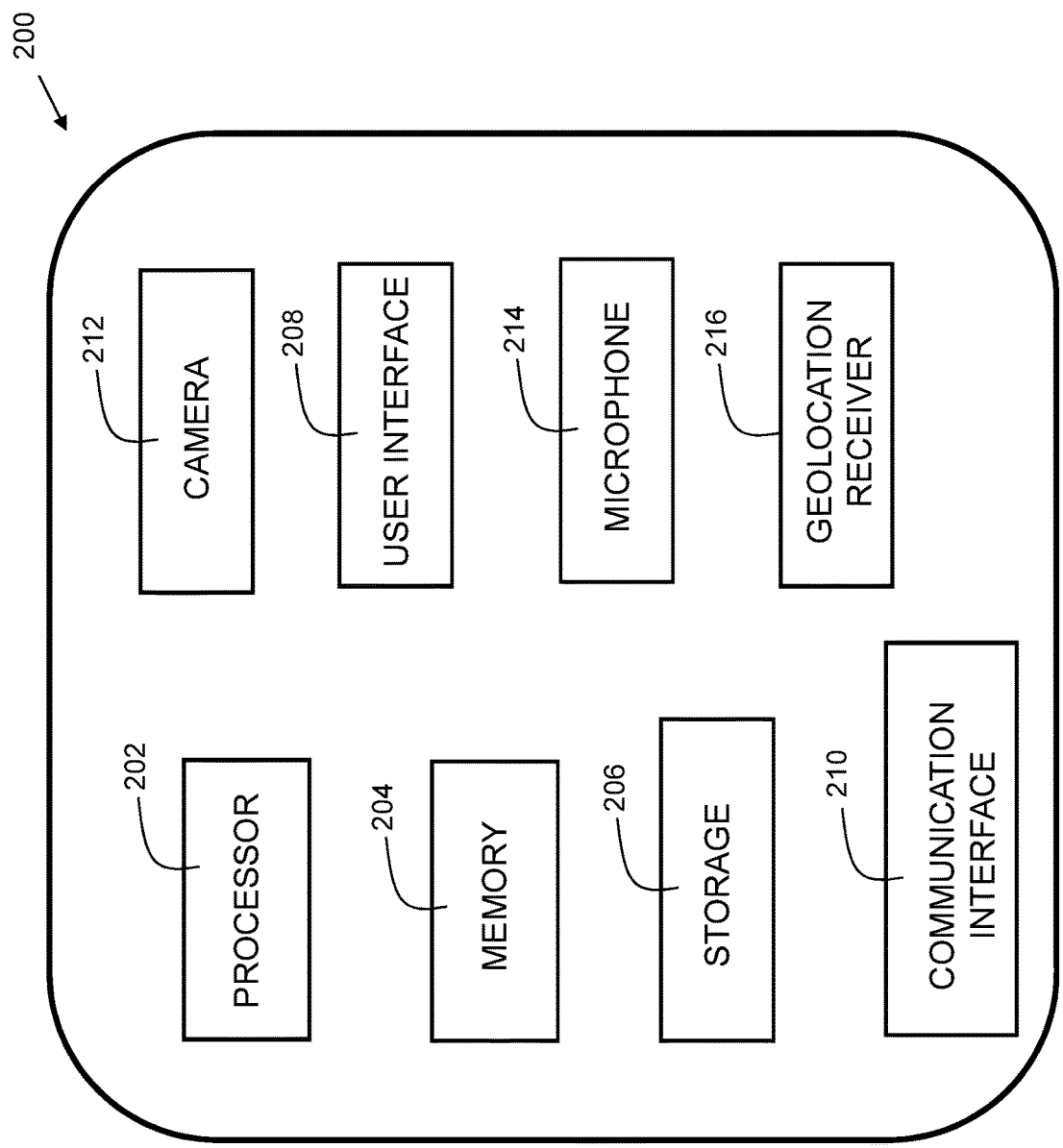
FIG. 2 is a client device in accordance with embodiments of the present invention.

FIG. 2 is a client device in accordance with embodiments of the present invention. Device 200 is shown as a simplified diagram of modules. Device 200 is an electronic computing device. Device 200 includes a processor 202, which is coupled to a memory 204. Memory 204 may include dynamic random access memory (DRAM), static random access memory (SRAM), magnetic storage, and/or a read only memory such as flash, EEPROM, optical storage, or other suitable memory. In some embodiments, the memory 204 may not be a transitory signal per se. Memory 204 includes instructions, which when executed by the processor, implement steps of the present invention. In embodiments, device 200 may have multiple processors 202, and/or multiple cores per processor.

Device 200 may further include storage 206. In embodiments, storage 206 may include one or more magnetic storage devices such as hard disk drives (HDDs). Storage 206 may include one or more solid state drives (SSDs). Any other storage device may be included instead of, or in addition to, those disclosed herein.

Device 200 further includes a user interface 208. In some embodiments, the user interface may include a display system, which may include one or more displays, examples of which include a liquid crystal display (LCD), a plasma display, a cathode ray tube (CRT) display, a light emitting diode (LED) display, an organic LED (OLED) display, or other suitable display technology. The user interface 208 may include a keyboard, mouse, and/or a touch screen, incorporating a capacitive or resistive touch screen in some embodiments.

The device 200 further includes a communication interface 210. In some embodiments, the communication interface 210 may include a wireless communication interface that includes modulators, demodulators, and antennas for a variety of wireless protocols including, but not limited to, Bluetooth™, Wi-Fi, and/or cellular communication protocols for communication over a computer network. Any communication interface, now known or hereafter developed, may be substituted.

The device 200 may further include a microphone 214 and camera 212. The device 200 further includes a geolocation receiver 216. Geolocation receiver 216 can include one or more of GPS, Galileo, GLOSNASS, or other system now known or hereafter developed.

Figure 3:
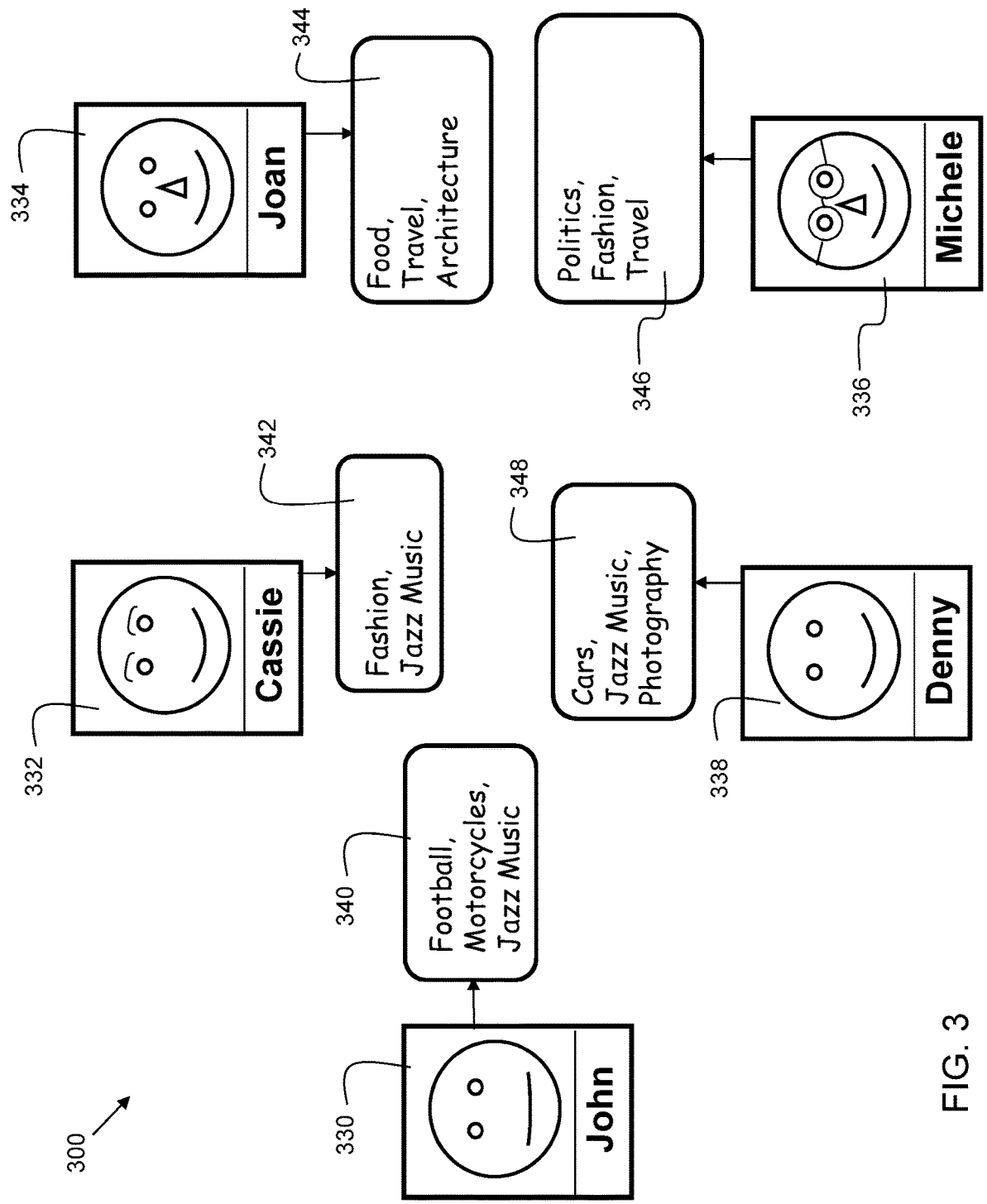
FIG. 3 is an example showing social media participants.

FIG. 3 is an example representation 300 showing participants (used interchangeably herein with "users") of a social networking website. The participants have each set up accounts on the social networking website. In order to use the social networking site, a person creates an account. This may include selecting a username, password, profile photo, and entering other information requested by the social networking site. An account usually includes an account page visible to the participant and other participants of the social networking site. This is called a "social media page" herein. A participant can establish a connection between his/her account with accounts of other participants by "friending" or "following" or otherwise selecting to connect. Examples of social networking sites include Facebook®, LinkedIn®, Twitter®, and Instagram®. Embodiments of the invention can be implemented with any social networking site now known or hereafter developed.

Participants can share (used interchangeably herein with "post") items of content, through their accounts, to their own social media pages or to the social media pages of others. Items of content may include text, images, videos, audio clips, song clips, animated images, and any other suitable content.

In embodiments, the account for each participant includes metadata relating to interests of the participant. The interests can be ascertained in one or more ways. In some embodiments, they can be ascertained by user reporting (i.e., a user may be asked to fill in a form about themselves when they register for their account). The form could ask particular questions such as asking the user to provide information regarding hobbies, work, and preferred music, each having a field in which the user can answer. Alternatively, the participant can fill in a field of comma separated values of his/her interests. In other embodiments, interests can be ascertained by system 102 scraping the account pages of the participant, the items of content shared to the participant's account, the items of content shared by the participant onto the pages of other participants, and/or messages of the participant to another participant (when the social networking site also includes a direct messaging function). In some embodiments, the interests can be ascertained by a combination of user reporting and page scraping. In some embodiments, computer analysis may locate metadata in a similar way to the location of metadata in shared items of content. Any method of collecting data relating to user interests is included within the scope of the invention.

In the example, John 330 (a social networking site participant) is shown associated with interests 340 in football, motorcycles, and jazz music. Cassie 332 is shown associated with interests 342 in fashion and jazz music. Joan 334 is shown associated with interests 344 in food, travel, and architecture. Michele 336 is shown associated with interests 346 in politics, fashion, and travel. Denny 338 is shown associated with interests 348 in cars, jazz music, and photography. Information containing these associations is collected from the respective user accounts of the participants.

Figure 4:
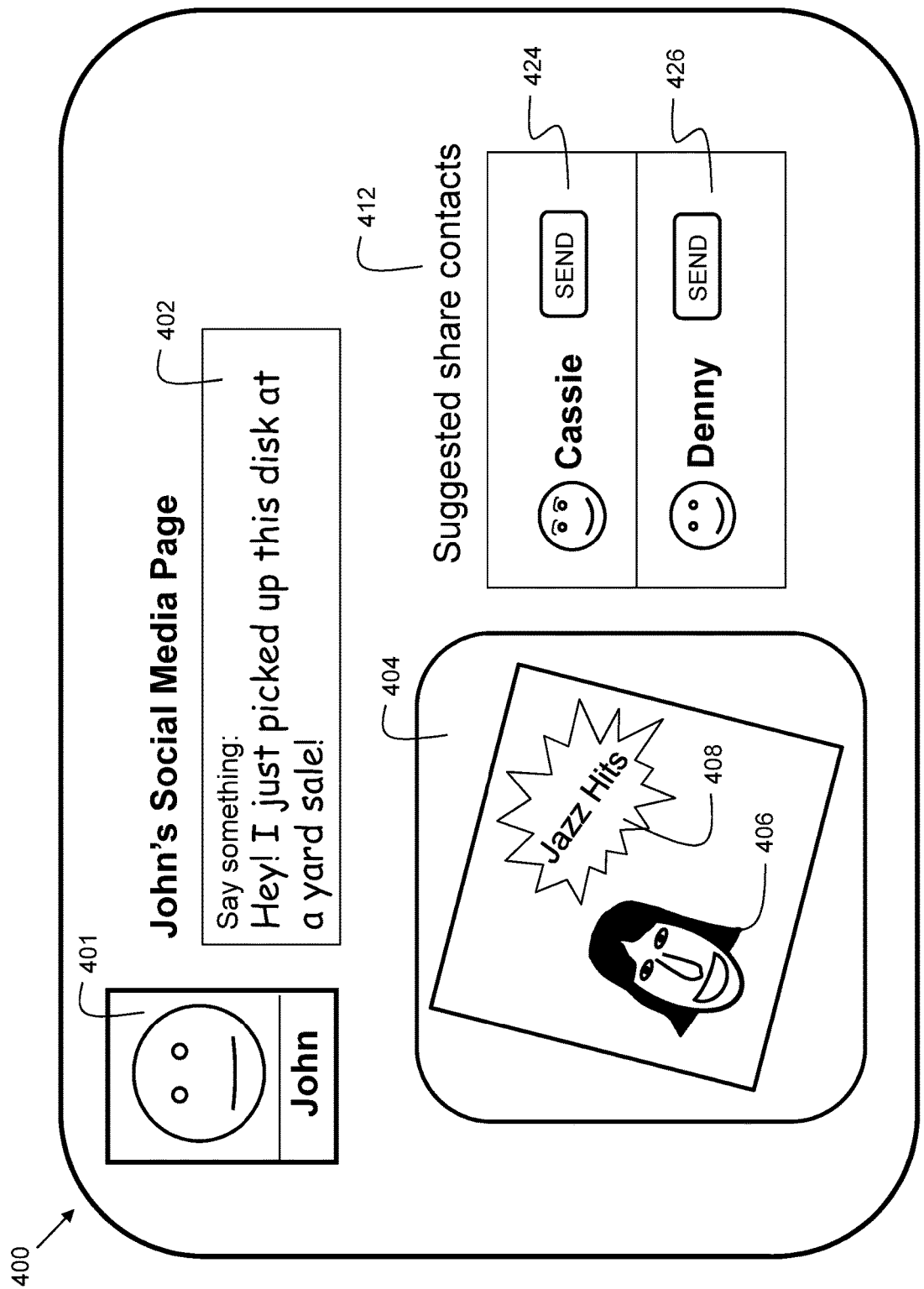
FIG. 4 shows an example user interface depicting identified potential recipients.

FIG. 4 shows an example user interface 400 depicting identified potential recipients. The user interface is John's social media page. A profile photo 401 shows an image of John's face. Recent posts by John are displayed, including text: "Hey, I just picked up this disk at a yard sale!" and an image 404 of an album cover. The album cover image includes a picture of a person 406 with text "Jazz Hits" 408. Since John shared the items of content 402 and 404 to his own social media page, such items of content are displayed on John's social media page.

Embodiments use content analysis to extract metadata from items of shared content, as well as user account social media pages. In embodiments, an interest correlation for each social media participant to the item of shared content is computed. This can be accomplished using natural language analysis, audio analysis, image analysis, optical character recognition (OCR), facial recognition, object recognition, speech recognition, or other suitable content analysis mechanism. The more keywords in common between the items of shared content and the interests of a participant of a social networking site, the higher the likelihood the item of shared content may be of interest to the participant.

Embodiments may use natural language analysis to locate keywords. Analysis may search for words and compare located words to a dictionary of known terms. The detected words that match known terms may be stored as metadata about the item of content.

Embodiments may use optical character recognition. A scanned image is analyzed for "light" and "dark" areas in order to detect the presence and shape of text characters. Keywords are extracted from the detected words formed by the characters. The keywords may be stored as metadata about the item of content.

Embodiments may use facial recognition. An item of content including an image or video may be analyzed. Edge detection, gradient processing, and other processes may be used to match features of a face in the image with a known face from a database, such as a celebrity or one of the participant's connections on the social media website. In addition, detection of facial expressions may be performed by computer-implemented recognition of one or more action units (AUs) from a face in the image. From the facial expressions, embodiments associate metadata with the items of content.

Embodiments may use speech processing. Speech detected in an audio clip, multimedia clip, song, etc., can be transformed to text. The text can be analyzed using natural language analysis to determine metadata.

Embodiments may use music or song genre recognition. A database may include metadata about songs, such as key, tempo, melody, etc. The database may include metadata about song genres such as typical chord progressions or key signatures of various types of music genres. Embodiments may analyze items of content including music clips for matches in the database to determine whether metadata can be assigned to the item based on a match of the song in the clip to a known song or music genre.

Embodiments may use object recognition. Using edge detection, gradient processing, and other processes, embodiments may detect objects in images. Such objects may be compared to a database of known images to determine whether any images match. If there is a match, metadata relating to the known image is stored in association with the item of content.

Metadata detected in items of content shared by a user is compared with metadata stored in association with a user account. The metadata stored in association with a user account are extracted from previous posts to that user account, items of content indicated as "liked" (associated icon button pressed by the user) by that user account, items of content clicked on by that user account, etc. The more matches between a shared item of content's metadata and a user account's metadata, the greater a likelihood the user of the user account will be interested in the item of content shared. Accordingly, embodiments may present that user account as a potential recipient of the shared item of content.

A subset of social media participants is generated wherein each social media participant in the subset of social media participants has an interest correlation above a predetermined threshold. An interaction score is generated for each social media participant in the subset. The subset of social media participants is ranked by an interaction score. One or more social media participants of the subset is presented on an electronic display as potential recipients for the item of shared content. This means a suggestion is made to the user to share the item of content with the one or more potential recipients.

Here, the subset of potential recipients includes Cassie at 424 and Denny at 426 because items of shared content, the text 402 and image 404, are determined to be related to jazz music. Language analysis located the term "jazz" and "disk" as related to music, and an image analysis with facial recognition determined that the person 406 is a famous jazz singer. The social media profiles corresponding to Cassie and Denny each have "jazz music" as one of their associated interests (see FIG. 3). Icon buttons 424 and 426 are shown on the user interface 400 with the suggestions so that the posting participant (the participant who shared the item of content), John here, can press with a mouse (or finger on a touch screen) to share the items of shared content with Cassie or Denny on their respective social media pages.

Figure 5A:
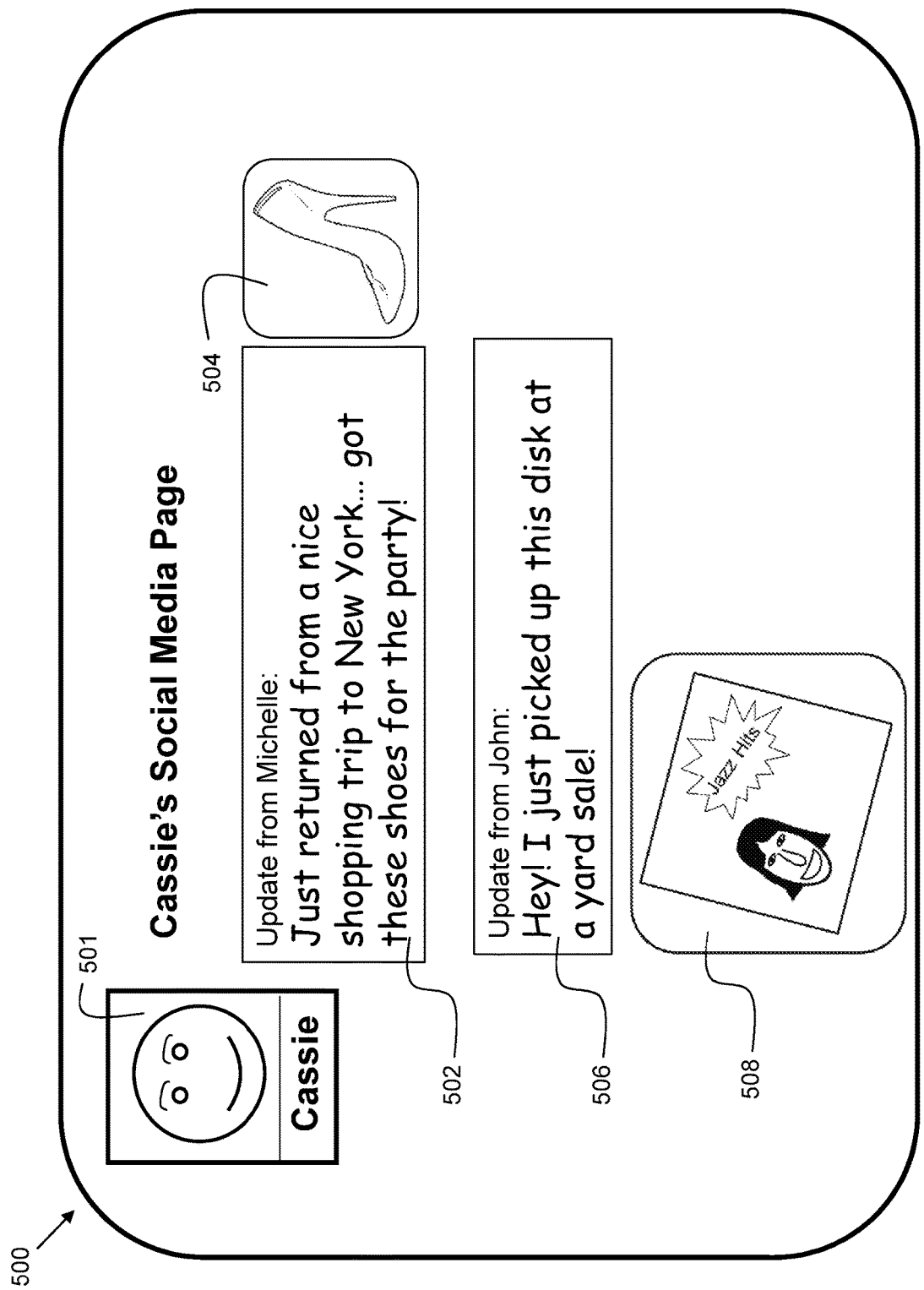
FIG. 5A shows an example user interface for a recipient at a first time.

FIG. 5A shows an example user interface 500 for a recipient at a first time. The user interface is Cassie's social media page. A profile photo 501 shows an image of Cassie's face. A recent post including items of content shared by Michele is shown on Cassie's page, including text 502: "Just returned from a nice shopping trip in New York . . . got these shoes for the party!" with an image 504 of a shoe. Also shown on Cassie's page is John's post. In the example of FIG. 4, John had selected "send" to share the item of content with Cassie in response to the suggestion at 424. Therefore, items of shared content, including text 506 and image 508 are displayed on Cassie's social media page.

Figure 5B:
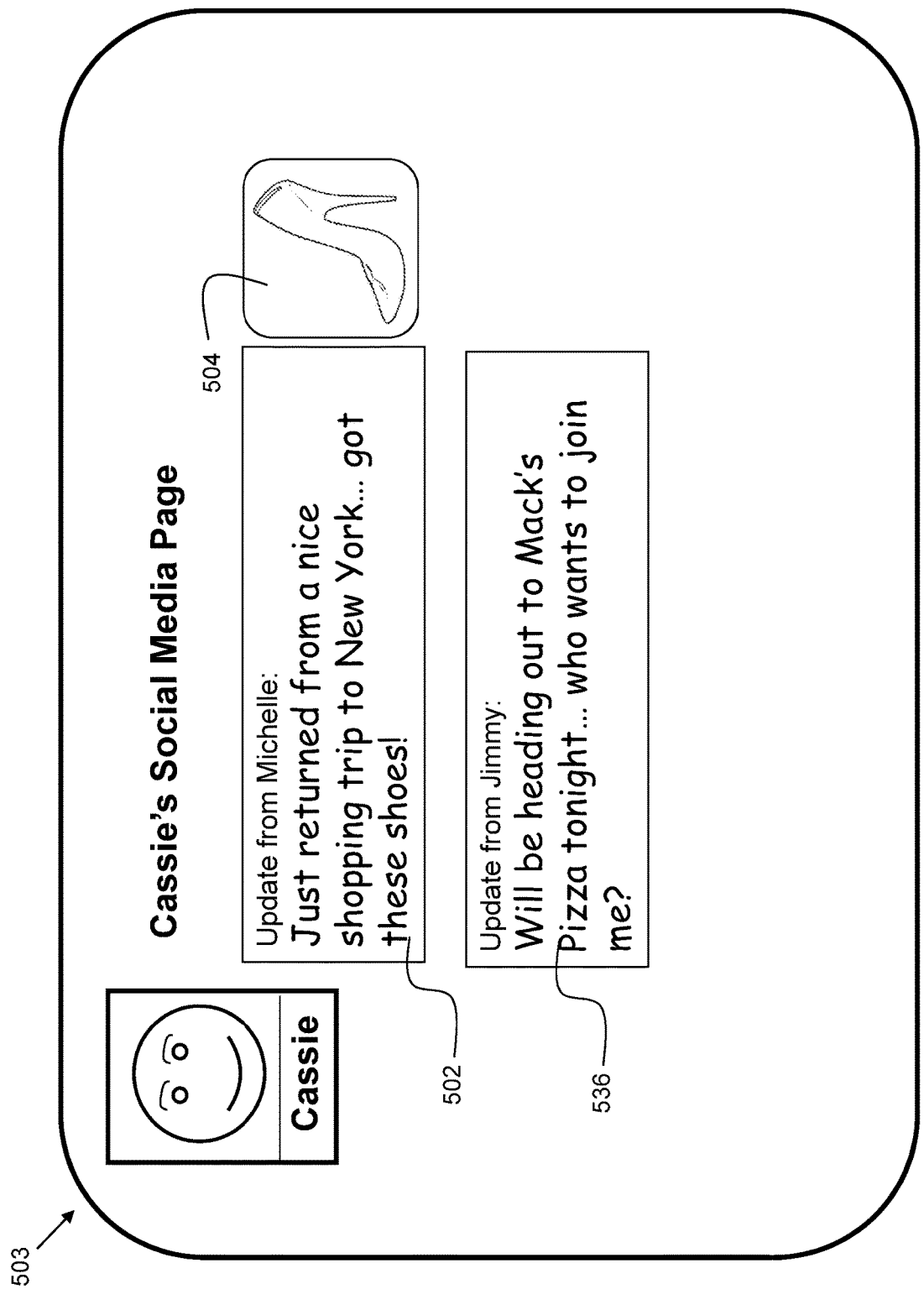
FIG. 5B shows an example user interface for a recipient at a second time after a time decay duration has elapsed.

FIG. 5B shows an example user interface 503 for a recipient at a second later time after a time decay duration has elapsed. Embodiments can include presenting the item of shared content to an account of at least one of the social media participants in the subset, computing a time decay duration for each social media participant based on the interaction score, and removing the presented item of shared content from the account when the time decay duration has elapsed. The time decay duration, in its simplest form, is how long an item of shared content s left up on a participant's social media page before expiring (i.e. being removed).

In the example, the user interface 503 is Cassie's social media page. Items of shared content, including text 502 and image 504, are still present on Cassie's page. A recent post from Jimmy, displayed on Cassie's page, includes an item of shared content, including text 536, reciting: "Will be heading out to Mack's Pizza tonight . . . who wants to join me?" Items of content 506 and 508 from John, as shown in FIG. 5A, have been removed from, i.e., are no longer displayed on Cassie's social media page since the "time decay duration" for such items of content has elapsed.

In some embodiments, the time decay duration may be determined based on an amount of time the posting participant and the participant, to whose account the item of content is shared (i.e., posted), have spent interacting with one another's posts (reviewing, clicking, etc.) in the past for a particular period of time. The time decay duration is computed based on that interaction information. In embodiments, the time decay factor D may be computed as:

$$D = K + V$$

Where:
D is the decay factor;
K is a constant; and
V is the amount of time two participants have spent viewing each other's content within a predetermined time period (e.g., 24 hours).

For example, if John and Cassie, in the past month have spent on average one hour per day interacting with the posts of the other, then, using the aforementioned formula, V is equal to 1, the time decay duration will then be K+1 hours. In the example, K is a constant of four hours, so John's post will be expired from Cassie's five hours after he posts it to Cassie's page. This is an example, and any suitable equation may be substituted.

In some embodiments, the time decay duration may be determined based on an average amount of time between the posting participant sharing an item of content and the receiving participant interacting with the post (view, click, like, share, etc.). For example, it could be an average for a previous three-month period. If the system determines it usually takes Cassie an average of eight hours to review a post shared on her social media page, then this number is used as the time decay duration. John's post will be expired eight hours after he shared it to her social media page. This is an example, and any suitable equation may be substituted.

In some embodiments, computing the time decay duration further includes computing a time zone factor. This helps account for differences in time of day for reviewing data. In embodiments, computing a time zone factor comprises retrieving a time zone from profile data. The participant may have specified a time zone in his/her profile information. Alternatively, the time zone can be detected from a geographic location of an address specified by a participant in his/her account. In embodiments, computing a time zone factor comprises retrieving a time zone from a geolocation receiver. The receiver may be on a participant's smartphone, tablet computer, desktop computer, or other device which the social media site can access.

For example, if the time decay duration is eight hours, but the recipient participant is on the west coast of the USA and the item of shared content was posted by the posting participant on the east coast of the USA at 6 am, three hours may be added to the time decay duration of 8 hours so that the recipient participant will have 11 hours, i.e. at least 3 hours after 6 an local time to review the post as s/he may be sleeping from 3 a.m.-6 a.m. This is an example, and any suitable calculation may be substituted.

FIG. 6 is a flowchart 600 indicating process steps for embodiments of the present invention. At 650, interest correlation is computed. At 652, a subset of social media participants is generated. The subset may be generated based on the interests (metadata) associated with the participants as determined by system 102 (FIG. 1). The interest metadata may be determined based on participant reporting or computerized scraping and analysis of their social media page for metadata, or other suitable method.

At 654, an interaction score is generated. The interaction score is a reflection of the relevance of the post to one or more participants as well as the typical interaction of the one or more participants with content shared previously by the posting user. An example interaction score algorithm is as follows:

$$S = K_1 X_1 + K_2 X_2 + K_3 X_3$$

Where:
S is the interaction score;
$K_1$, $K_2$, and $K_3$, are constants, tunable for the algorithm;
$X_1$ is the number of keywords in the metadata of an account of a participant that matches keywords determined for the item of shared content;
$X_2$ is an instance interaction factor. The instance interaction factor is a number determined by the amount of interaction between the posting participant and the other participant in terms of the number of queries or accesses of the other participant's content over a predetermined time interval; and
$X_3$ is a temporal interaction factor. The temporal interaction factor is a number determined by the amount of interaction between the posting participant and the other participant in terms of the amount of time spent viewing the other participant's content. Thus, in embodiments, generating an interaction score further comprises determining, for each social media participant in the subset, a number of previous content views by an account of a user. Furthermore, in embodiments, generating an interaction score further comprises determining, for each social media participant in the subset, a viewing duration of content belonging to an account of a user.

When S is above a predetermined threshold, content is deemed to be shareworthy with the participant. In embodiments, an algorithm such as the aforementioned may be applied to each contact/participant in a user's social media network. Thus, in embodiments, generating an interaction score comprises determining a number of previous relevant content shares for each social media participant in the subset.

At 658, the subset is ranked based on the interaction score. At 660, it is determined whether the interaction score is above a threshold. If not, at 662, it is excluded from a presentation list. If so at 660, then at 664, it is included in a presentation list. At 666, the time decay duration is computed.

Figure 7:
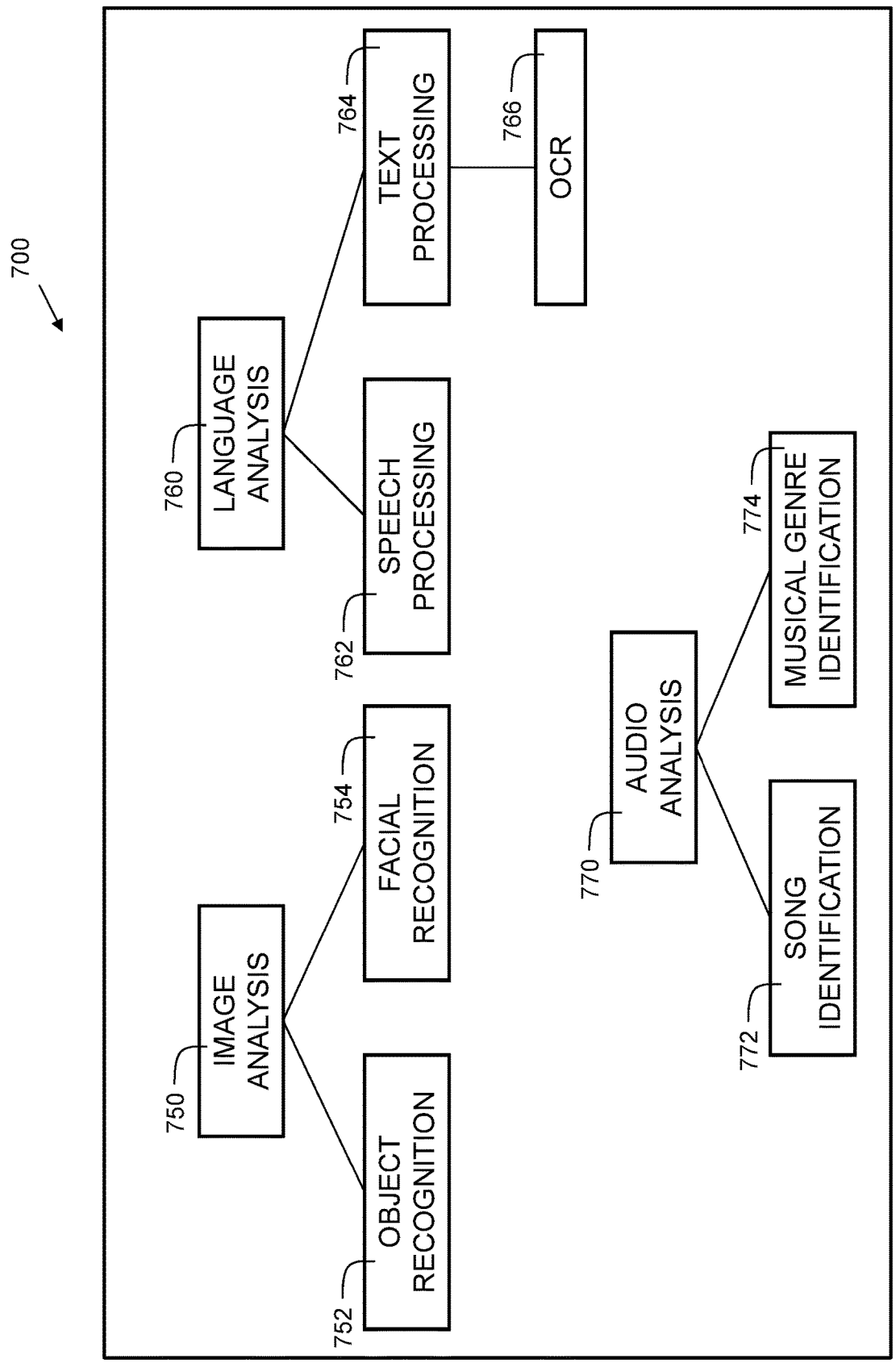
FIG. 7 shows a block diagram of modules utilized in embodiments of the present invention.

FIG. 7 shows a block diagram 700 of modules utilized in embodiments of the present invention. At 750, there is shown an image analysis module. The image analysis module may perform preprocessing tasks for other modules. This may include filtering, noise removal, edge detection, contrast enhancement, light correction, rotation, zooming, cropping, and/or other processes to allow further processing of images. The images may be recognized and keywords can be generated that pertain to the images. Thus, in embodiments, generating one or more item keywords is performed using image analysis.

At 752, there is shown an object recognition module. The object recognition module may utilize techniques including deep learning based approaches such as convolutional neural networks, and feature-based approaches using edges, gradients, histogram of oriented gradients (HOG), Haar wavelets, and/or linear binary patterns. The object recognition module 752 may be used to automatically recognize and classify objects in user content. The recognized objects can be used to generate keywords. Thus, in embodiments, the interest correlation for each social media participant comprises generating one or more item keywords for the item of shared content, and searching through a list of social media participants to identify participant keywords.

At 754, there is shown a facial recognition module. The facial recognition module may use image classifiers, action units, facial feature identification, and/or other techniques to recognize a face in a piece of sharable content. The face may be recognized as a contact in a social media system on the face of a well-known person (e.g., a celebrity), as examples. Thus, in embodiments, the image analysis includes facial recognition.

At 760, there is shown a language analysis module. The language analysis module may perform tasks such as natural language identification. For example, text and/or speech can be analyzed to make an assessment as to if the language is English, German, French, etc. For text, this can be performed based on keyword matching to databases of known languages. For uttered speech from audio content, the speech processing module (762) may convert the utterances to phonemes, which are in turn converted to text for language analysis. Thus, in embodiments, the natural language processing includes language identification.

At 762, there is shown a speech processing module. The speech processing module may break digitized audio samples of utterances into phonemes. Using a database, the speech processing module then matches the analyzed words with the text that best matches the groups of phonemes that comprise a word or phrase. The database may contain multiple distinct patterns of speech waves that certain words create, along with the written text of those words. The speech processing module may utilize Hidden Markov Models (HHMs), or other suitable methods for determining text corresponding to uttered speech.

At 764, there is shown a text processing module. The text processing module may perform part of speech identification, concordance, disambiguation, sentiment analysis and/or other tasks to determine a likely meaning for the text.

At 766, there is shown an optical character recognition module. The optical character recognition (OCR) module performs pattern analysis to identify printed and/or handwritten characters to associate them with computer-recognized characters such as ASCII characters, Unicode characters, UTF-8 characters, and/or other suitable sets of characters.

At 770, there is shown an audio analysis module. The audio analysis module may perform various tasks for analyzing audio content. These can include preprocessing tasks such as noise removal, frequency filtering, and frequency enhancement. Preprocessed audio can then be further analyzed for additional features.

At 772, there is shown a song identification module. The song identification module may receive preprocessed audio from the audio analysis module 770. The song identification module may utilize tempo analysis, frequency analysis, and/or other techniques to derive an audio fingerprint for an audio sample. The audio fingerprint may be compared with a database of known music, and a song can be identified based on a match with the audio fingerprint and a record from the database.

At 774, there is shown a musical genre identification module. The musical genre identification module may receive preprocessed audio from the audio analysis module 770. In embodiments, an automated musical genre identification may be performed. A particular musical genre is characterized by statistical properties related to the tempo, rhythmic structure, instrumentation, and form of the audio waveforms. These factors may be used to determine a likely musical genre for an audio sample (e.g., Jazz).

In some embodiments, some of the modules could be implemented in a cloud network. In some embodiments, the modules are implemented in a mix of client and server. Still yet in some embodiments, the modules may all be implemented on the server. In embodiments, natural language processing is performed using one or more of the aforementioned modules. The natural language processing can include text processing, speech processing, and/or language identification.

Figure 8:
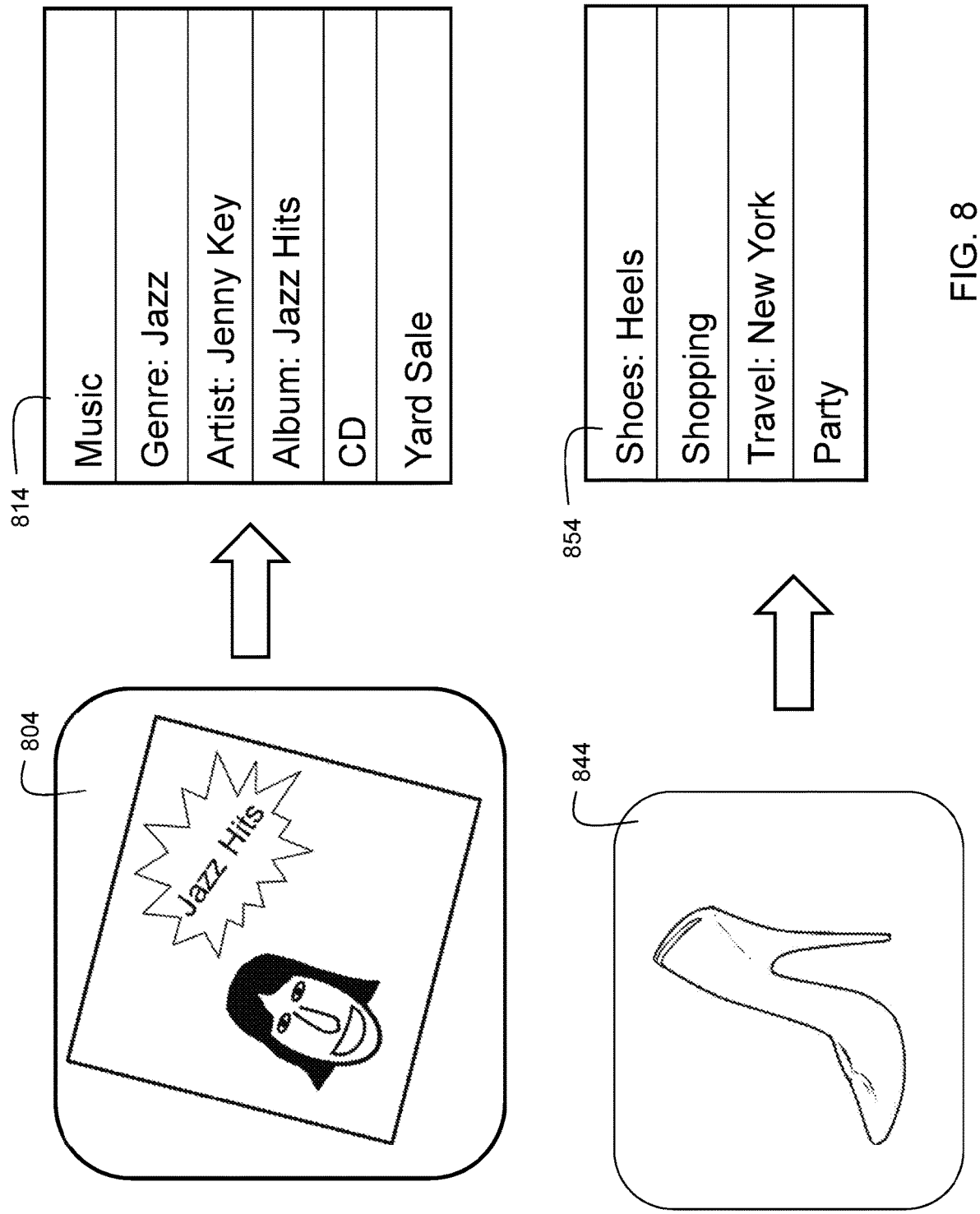
FIG. 8 shows examples of computer-generated metadata for an item of shared content.

FIG. 8 shows examples of computer-generated metadata for an item of shared content. Item of shared content 804 is shown in association with metadata 814. The metadata 814 includes "Music," "Genre: Jazz," "Artist: Jenny Key," "Album: Jazz Hits," "CD," and "Yard Sale." Item of shared content 844 is shown in association with metadata 854. The metadata includes "Shoes: Heels," "Shopping," "Travel: New York," and "Party." Metadata 814 and 854 are computer generated, meaning at least a portion of it comes from computerized analysis of the text, image, audio clip, or video clip being shared. The association may be embodied in a relational database or other suitable data structure.

Embodiments of the invention improve the technical field of electronic communication. Using techniques of disclosed embodiments, information can be disseminated in a timelier and efficient manner. The time decay duration of disclosed embodiments optimizes display resources by automatically removing information that is likely to be no longer needed, thereby making for a more improved use of computing resources.

As can now be appreciated, disclosed embodiments provide techniques for automatically suggesting members of a social media system as recipients for sharing an item of social media content. This enables convenient selection of social media contents for sharing. Such a feature can make it more fun to use social media. Furthermore, it can facilitate additional sharing by alerting or reminding participants of contacts, friends, and others who may be interested in what they are about to share. For example, there may be contacts (friends) in a participant's network for which the participant was not aware of the potential interest in the subject matter of the item of social media content. With disclosed embodiments, the participant is prompted to share the content with these contacts. In this way, the social media experience can be enhanced.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for providing a set of social media participants as potential recipients of an item of shared content, comprising:
    computing, prior to sending the item of shared content, an interest correlation that is specific to the item of shared content for each social media participant, the interest correlation indicating, for each social media participant, an amount of interest the social media participant has in the item of shared content;
    computing, prior to sending a second item of shared content, a second interest correlation that is specific to the second item of shared content for each social media participant, the second interest correlation indicating, for each social media participant, an amount of interest the social media participant has in the second item of shared content;
    generating a subset of social media participants wherein each social media participant in the subset of social media participants has an interest correlation above a predetermined threshold;
    generating a second subset of social media participants wherein each social media participant in the second subset of social media participants has an interest correlation above a predetermined threshold, wherein the second subset of social media participants contains at least one social media participant that is not a member of the subset of social media participants;
    generating an interaction score for each social media participant in the subset and the second subset;
    ranking each of the subset and second subset of social media participants by interaction score; and
    presenting one or more social media participants of the subset on an electronic display as potential recipients for the item of shared content and one or more participants of the second subset on an electronic display as potential recipients of the second item of shared content, such that social media participants who are most interested in the item of shared content are presented with the item of shared content and social media participants who are most interested in the second item of shared content are presented with the second item of shared content.

2. The method of claim 1, wherein computing the interest correlation for each social media participant comprises:
    generating one or more item keywords for the item of shared content; and
        searching through a list of social media participants to identify participant keywords.

3. The method of claim 2, wherein generating one or more item keywords is performed using image analysis.

4. The method of claim 3, wherein the image analysis includes facial recognition.

5. The method of claim 2, wherein generating one or more item keywords is performed using natural language processing.

6. The method of claim 5, wherein the natural language processing includes text processing.

7. The method of claim 5, wherein the natural language processing includes speech processing.

8. The method of claim 7, wherein the natural language processing includes language identification.

9. The method of claim 2, wherein generating one or more item keywords is performed using song identification.

10. The method of claim 2, wherein generating one or more item keywords is performed using musical genre identification.

11. The method of claim 1, further comprising:
presenting the item of shared content to an account of at least one of the social media participants in the subset;
computing a time decay duration that is specific to the item of shared content for each social media participant to which the item of shared content was presented based on the interaction score; and
removing a presented item of shared content from the account when the time decay duration has elapsed.

12. The method of claim 11, wherein computing the time decay duration further includes computing a time zone factor.

13. The method of claim 12, wherein computing a time zone factor comprises retrieving a time zone from profile data.

14. The method of claim 12, wherein computing a time zone factor comprises retrieving a time zone from a geolocation receiver.

15. The method of claim 1, wherein generating an interaction score comprises determining a number of previous relevant content shares for each social media participant in the subset.

16. The method of claim 15, wherein generating an interaction score further comprises determining, for each social media participant in the subset, a number of previous content views by an account of a user.

17. The method of claim 15, wherein generating an interaction score further comprises determining, for each social media participant in the subset, a viewing duration of content belonging to an account of a user.

18. An electronic communication device comprising:
a processor;
a memory coupled to the processor, the memory containing instructions, that when executed by the processor, perform the steps of:
computing an interest correlation that is specific to the item of shared content for each social media participant, the interest correlation indicating, for each social media participant, an amount of interest the social media participant has in the item of shared content;
computing a second interest correlation that is specific to a second item of shared content for each social media participant, the second interest correlation indicating, for each social media participant, an amount of interest the social media participant has in the second item of shared content;
generating a subset of social media participants wherein each social media participant in the subset of social media participants has an interest correlation above a predetermined threshold;
generating a second subset of social media participants wherein each social media participant in the second subset of social media participants has an interest correlation above a predetermined threshold, wherein the second subset of social media participants contains at least one social media participant that is not a member of the subset of social media participants;
generating an interaction score for each social media participant in the subset and the second subset;
ranking each of the subset and second subset of social media participants by interaction score; and
presenting one or more social media participants of the subset on an electronic display as potential recipients for the item of shared content and one or more participants of the second subset on an electronic display as potential recipients of the second item of shared content, such that social media participants who are most interested in the item of shared content are presented with the item of shared content and social media participants who are most interested in the second item of shared content are presented with the second item of shared content.

19. The device of claim 18, wherein the memory further comprises instructions, that when executed by the processor, perform the steps of:
presenting the item of shared content to an account of at least one of the social media participants in the subset;
computing a time decay duration for each social media participant based on the interaction score; and
removing a presented item of shared content from the account when the time decay duration has elapsed.

20. A computer program product for providing a set of social media participants as potential recipients of an item of shared content, for an electronic computing device comprising a computer readable storage medium having program instructions embodied therewith, the program instructions executable by a processor to cause the electronic computing device to:
compute an interest correlation that is specific to the item of shared content for each social media participant, the interest correlation indicating, for each social media participant, an amount of interest the social media participant has in the item of shared content;
compute a second interest correlation that is specific to a second item of shared content for each social media participant, the second interest correlation indicating, for each social media participant, an amount of interest the social media participant has in the second item of shared content;
generate a subset of social media participants wherein each social media participant in the subset of social media participants has an interest correlation above a predetermined threshold;
generate a second subset of social media participants wherein each social media participant in the second subset of social media participants has an interest correlation above a predetermined threshold, wherein the second subset of social media participants contains at least one social media participant that is not a member of the subset of social media participants;
generate an interaction score for each social media participant in the subset and the second subset;
rank each of the subset and second subset of social media participants by interaction score; and
present one or more social media participants of the subset on an electronic display as potential recipients for the item of shared content and one or more participants of the second subset on an electronic display as potential recipients of the second item of shared content, such that social media participants who are most interested in the item of shared content are presented with the item of shared content and social media participants who are most interested in the second item of shared content are presented with the second item of shared content.

* * * * *